United States Patent
Domi et al.

(10) Patent No.: US 7,667,668 B2
(45) Date of Patent: Feb. 23, 2010

(54) FRACTIONAL VIDEO TOUCH PANELS

(75) Inventors: Dwayne K. Domi, Escondido, CA (US); Randy Schafer, San Juan Capistrano, CA (US)

(73) Assignee: RedRadio, Inc., Escondido, CA (US)

( * ) Notice: Subject to any disclaimer, the term of this patent is extended or adjusted under 35 U.S.C. 154(b) by 602 days.

(21) Appl. No.: 10/961,607

(22) Filed: Oct. 8, 2004

(65) Prior Publication Data

US 2006/0077120 A1 Apr. 13, 2006

(51) Int. Cl.
G09G 5/00 (2006.01)

(52) U.S. Cl. .......................................... 345/2.2; 345/2.1

(58) Field of Classification Search ........... 345/1.1–1.3, 345/2.1
See application file for complete search history.

(56) References Cited

U.S. PATENT DOCUMENTS

| | | | |
|---|---|---|---|
| 6,084,553 A | 7/2000 | Walls et al. ................... 345/1 |
| 6,104,414 A | 8/2000 | Odryna et al. .............. 345/509 |
| 6,140,987 A * | 10/2000 | Stein et al. .................... 345/87 |
| 6,292,157 B1 | 9/2001 | Greene et al. ................... 345/1 |
| 6,340,957 B1 | 1/2002 | Adler et al. ................... 345/1.3 |
| 6,344,836 B1 * | 2/2002 | Suzuki ........................ 345/2.1 |
| 6,377,228 B1 | 4/2002 | Jenkin et al. ................ 345/1.3 |
| 6,501,441 B1 * | 12/2002 | Ludtke et al. ................ 345/1.1 |
| 6,680,714 B2 | 1/2004 | Wilmore ..................... 345/1.1 |
| 6,956,541 B2 * | 10/2005 | McClintock ................ 345/1.1 |
| 7,047,092 B2 * | 5/2006 | Wimsatt ....................... 700/83 |
| 2001/0012014 A1 | 8/2001 | Lefebvre et al. ............ 345/541 |
| 2001/1003064 * | 10/2001 | Mamiya et al. ............ 345/530 |
| 2001/0052902 A1 | 12/2001 | Ono et al. ................... 345/502 |
| 2002/0196205 A1 | 12/2002 | Yamakado et al. .......... 345/33 |
| 2003/0020671 A1 | 1/2003 | Santoro et al. .............. 345/1.3 |
| 2004/0008155 A1 | 1/2004 | Cok ........................... 345/1.3 |
| 2005/0120081 A1 * | 6/2005 | Ikenn ........................ 709/203 |

* cited by examiner

*Primary Examiner*—Bipin Shalwala
*Assistant Examiner*—Steven E Holton
(74) *Attorney, Agent, or Firm*—Pillsbury Winthrop Shaw Pittman LLP

(57) ABSTRACT

An apparatus or multiple driver video card that simplifies user interface design through displaying portions of a single image on multiple screens, and processing feedback from multiple devices as if the interface was a single device. Method, device, and computer-readable medium embodiments generate a user interface image, separate the user interface image into a plurality of sub-images, convey the plurality of sub-images to remote terminals, and configured to receive input data from the remote terminals.

37 Claims, 8 Drawing Sheets

FRACTIONAL VIDEO TOUCH PANELS

BACKGROUND

1. Field of the Invention

Aspects of the present invention relate in general to home automation. Aspects include a graphical user interface apparatus, system, method and computer-readable medium. Further aspects of the invention include an apparatus or multiple driver video card that simplifies user interface design through displaying portions of a single image on multiple screens, and processing feedback from multiple devices as if the interface was a single device.

2. Description of the Related Art

The field of home automation is flourishing. In most automated homes, numerous remote terminals communicate with a central computing device that controls the home. The controlled system may include the heating, ventilation and air-conditioning (HVAC) system, home entertainment system, and security system. So-called "flat-panel" or "liquid crystal display" (LCD) remote terminals are expensive. The higher cost is each flat-panel remote terminal includes a computing device known as a programmable logic controller (PLC), which controls the image displayed upon the liquid crystal or flat-panel, processes user input, and sends the input back to the central computing device. These programmable logic controllers are programmed using an antiquated system of "ladder logic" that mirrors old wire-diagrams, and are consequently difficult (and expensive) to maintain.

SUMMARY

Embodiments of the invention include an apparatus or multiple driver video card that simplifies user interface design through displaying portions of a single image on multiple screens, and processing feedback from multiple devices as if the interface was a single device. Embodiments are configured to generate a user interface image, separate the user interface image into a plurality of sub-images, convey the plurality of sub-images to remote terminals, and configured to receive input data from the remote terminals.

DETAILED DESCRIPTION

One aspect of the present invention includes the realization that remote terminals may be implemented inexpensively by removing the programmable logic controller off of the terminal and redistributing the image generation and computing power to a multiple driver video card embodiment.

Embodiments of the present invention include an apparatus, method, and computer-readable medium configured to generate and partition an image into numerous images to be displayed on remote terminals, receive input data from the remote terminals, and processing the input as instructions for the control system. Other embodiments of the present invention may include remote terminals that receive input data from a multiple driver video card or apparatus.

Figure 5A:
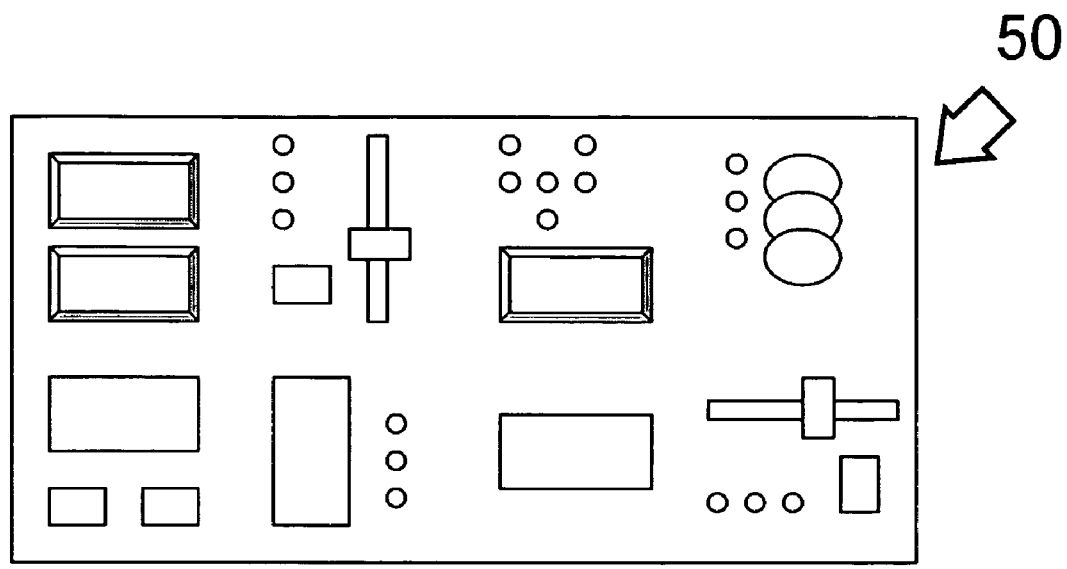
FIGS. 5A-E illustrates example images, which are broken into multiple screens to simplify user interface design and user interface input processing.
Figure 5B:
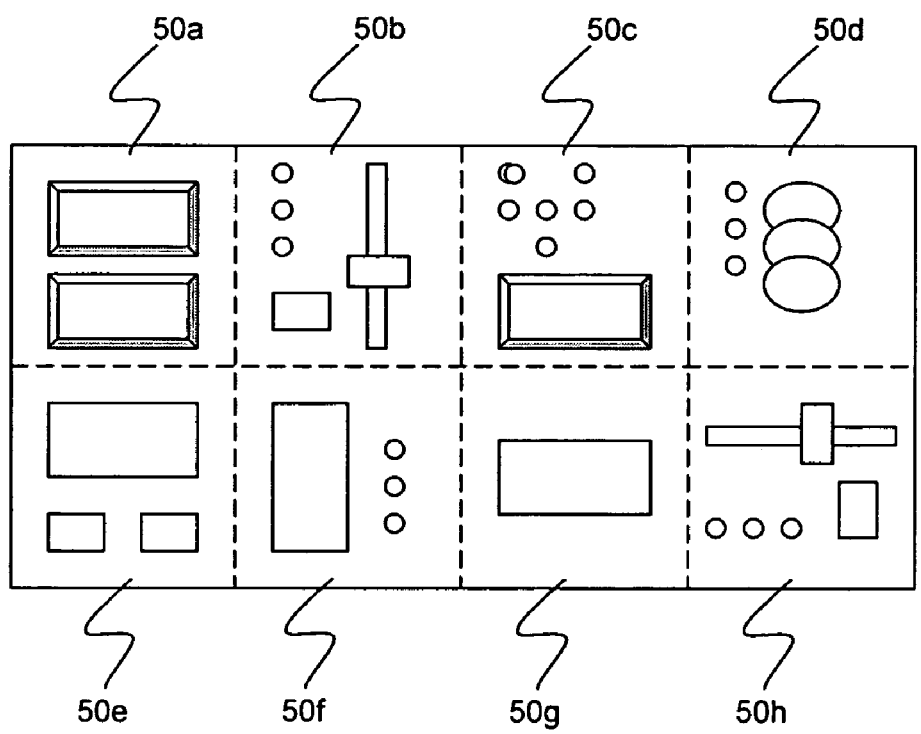
Figure 5C:
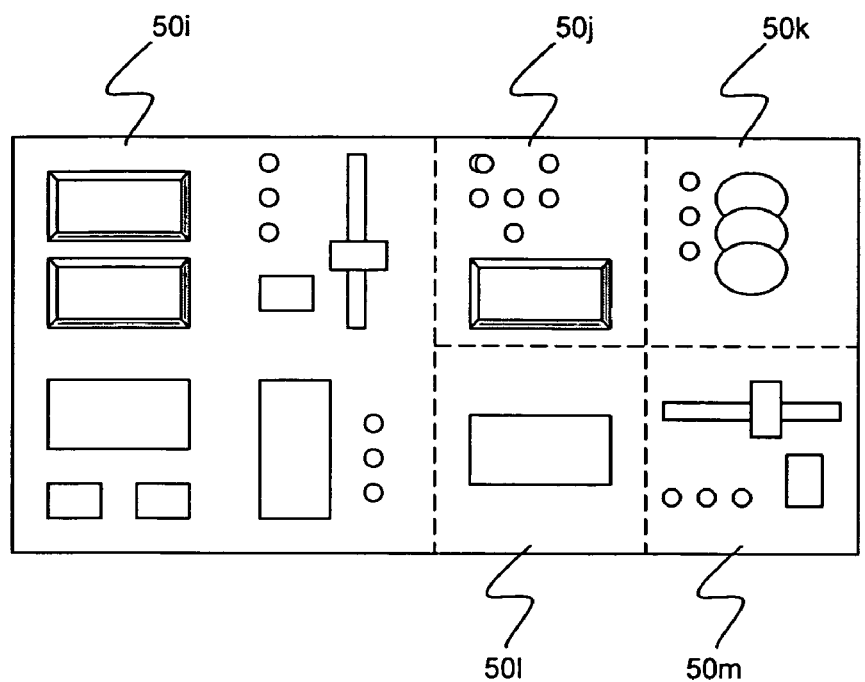
Figure 5D:
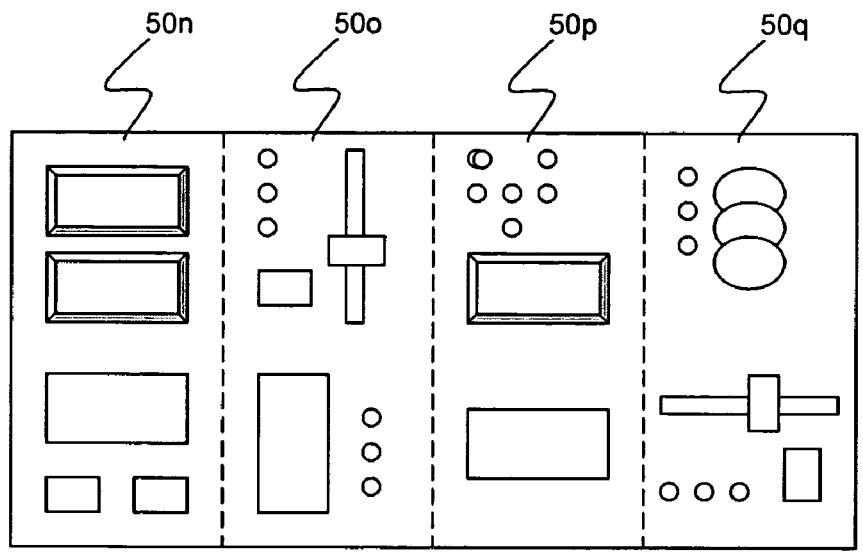
Figure 5E:
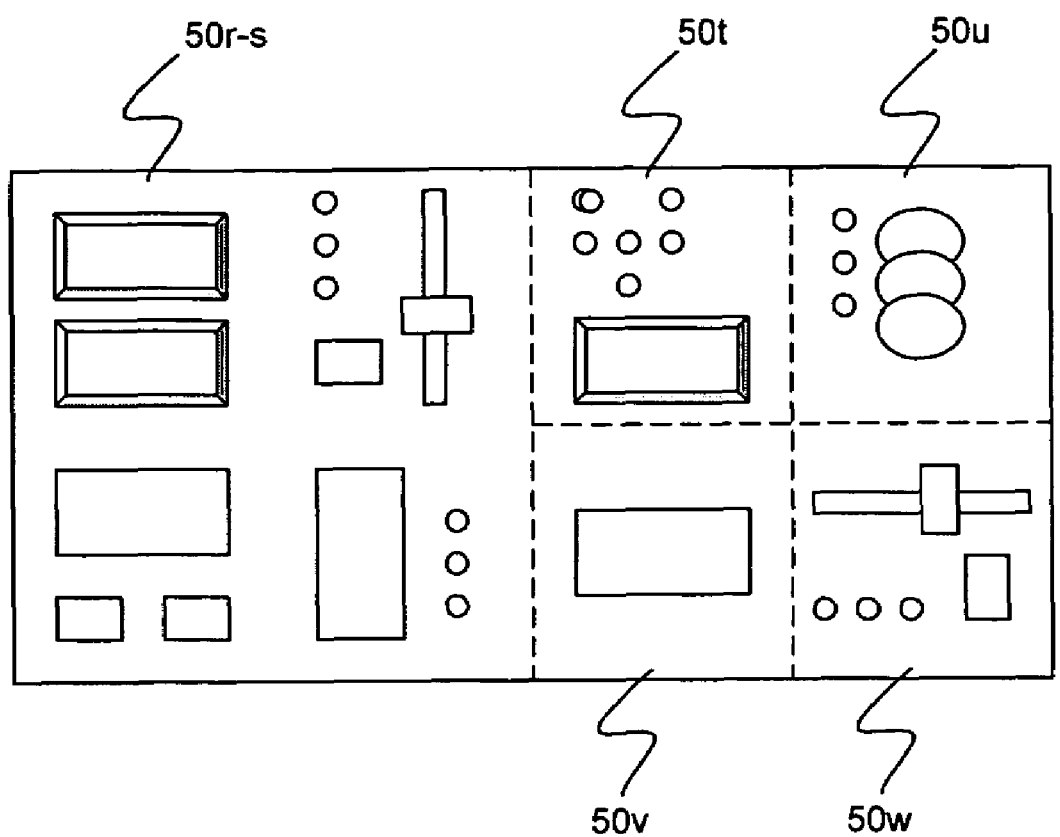

Operation of embodiments of the present invention may be illustrated by example. FIGS. 5A-E depict example images which are broken into multiple screens, to simplify user interface design and user interface input processing, constructed and operative in accordance with an embodiment of the present invention. Suppose a user interface image 50, as shown in FIG. 5A, is an any-sized-image, filled with buttons, radio buttons, slider bars, check boxes, menus, dialog boxes, indicators, graphics, pictures and/or any other graphical user interface object known in the art. Embodiments, including, but not limited to, controller devices, multiple driver video cards, methods, computer-readable media, and other apparatus embodiments separate portions of the user interface image 50 into multiple sub-images 50a-h, as shown in FIG. 5B, each sub-image generated to be displayed upon a remote terminal. Embodiments may generate any number of sub-images, such as the four sub-images 50n-q shown in FIG. 5D, and sub-images may be of different sizes, as shown by sub-images 50i-m of FIG. 5C. Additionally, sub-images may overlap and repeat image data, as depicted by sub-images 50r-s of FIG. 5E.

In addition to separating the user-interface image 50 into sub-images to be displayed upon remote terminals, an embodiment also processes remote terminal input, which allows a system using the embodiment to "pretend" that it is receiving input from a single user interface, instead of multiple interfaces. In other words, embodiments mask the presence of multiple terminals, allowing a system to see a single user-interface, thus simplifying the user-interface design for the entire system.

Figure 1A:
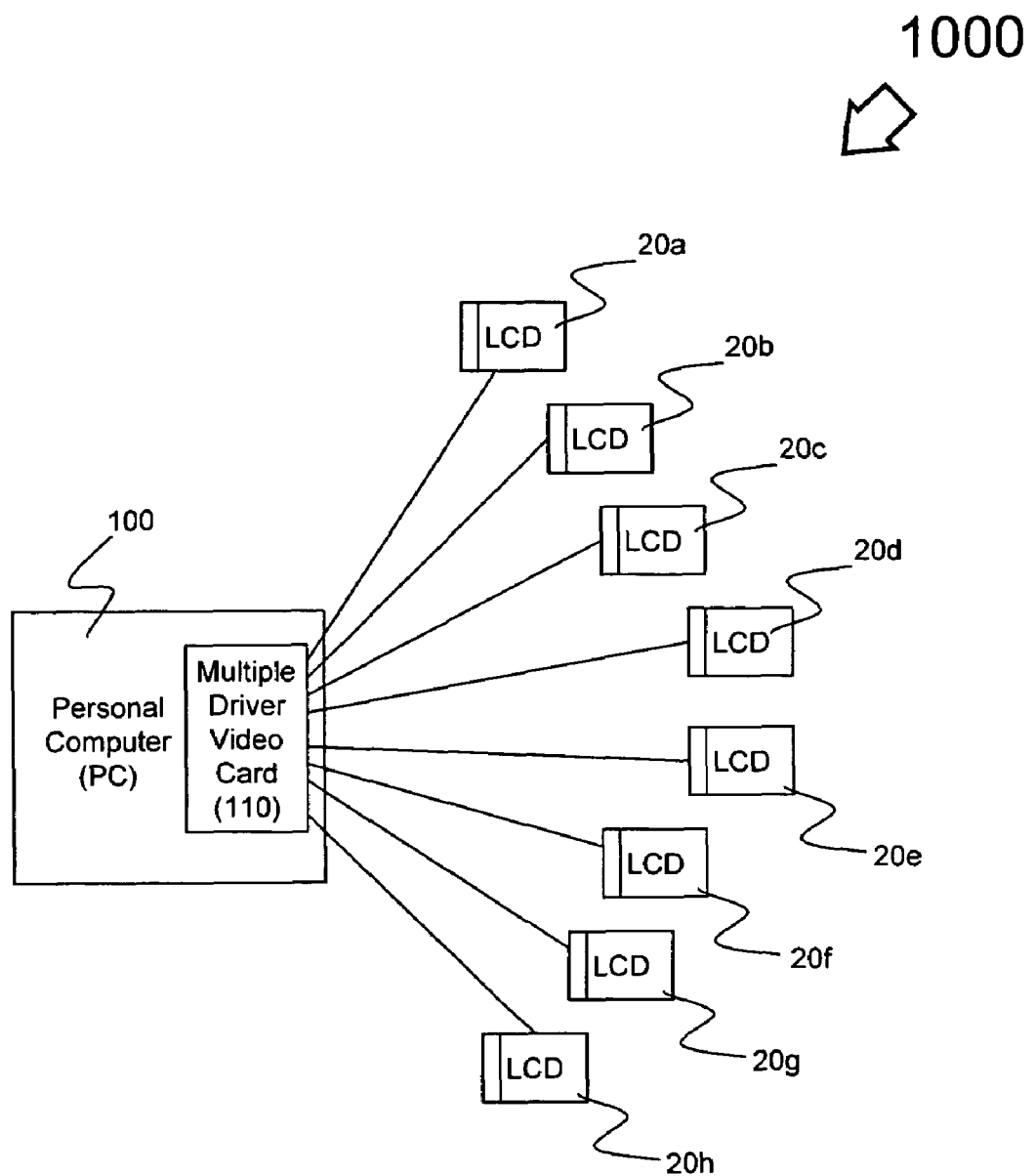
FIGS. 1A-B illustrates an embodiment of a system that simplifies user interface design through displaying portions of a single image on multiple screens, and processing feedback from multiple devices as if the interface was a single device.
Figure 1B:
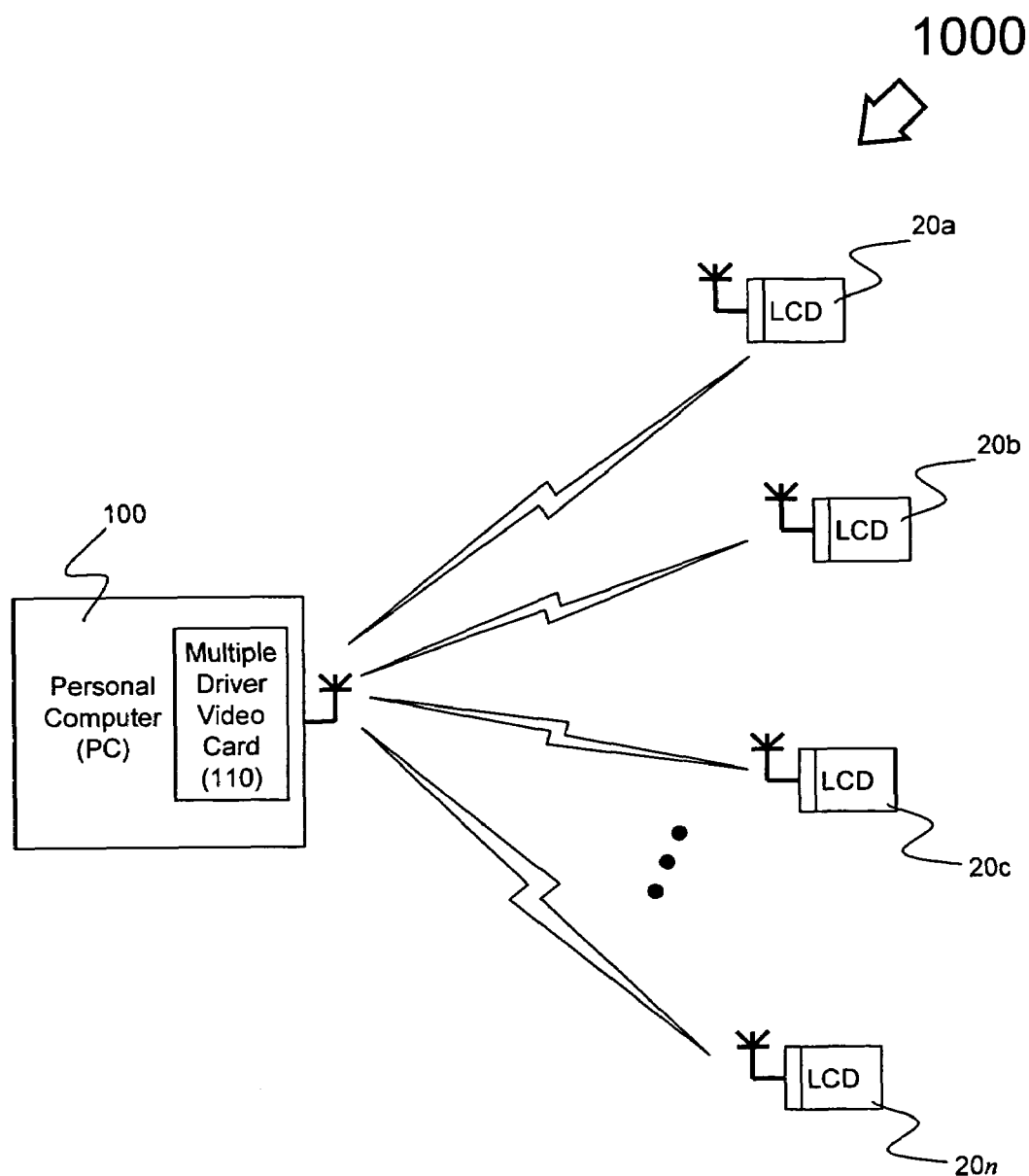

FIG. 1A illustrates an embodiment of a home automation system 1000 controlled by a personal computer or home automation computer 100, constructed and operative in accordance with an embodiment of the present invention. Home automation computer 100 includes a multiple driver video card 110, which facilitates the image displayed on remote terminals 20a-h. Home automation computer 100 is discussed in greater detail below. In this embodiment, remote terminals 20a-h are touch-screen liquid crystal display (LCD) terminals, although other types of remote terminals may be used, as is known in the art. For illustrative purposes only, eight remote terminals 20 are shown, coupled to the multiple driver video card 110, although any number of remote terminals 20 may be used. Remote terminals may be coupled to multiple driver video card 110 by any means known in the art, such a direct video connection or any communication network known in the art, including the Internet, local-area-network (LAN), wide-area-network (WAN), wireless local area network (WLAN), or any system that links a computer to remote terminal 20. Further, communication network embodiments may be of configured in accordance with any topology known in the art, including star, ring, bus, or any combination thereof. FIG. 1B depicts an embodiment where home automation computer 100 and remote terminals 20a-n are connected wirelessly, constructed and operative in accordance with an embodiment of the present invention. The wireless connection may be any wireless connection known in the art, including, but not limited to: ultra-wide-band (UWB), a wireless implementation of Institute of Electrical and Electronics Engineers (IEEE) Standard No. 1394 ('wireless Firewire'), wireless Universal Serial Bus (USB), Institute of Electrical and Electronics Engineers (IEEE) Standard Nos. 802.11a, IEEE 802.11b ("Wi-Fi"), IEEE 802.11g, IEEE 802.15 (WPAN), Bluetooth, and a wireless implementation of the RS-232 protocol.

Figure 2:
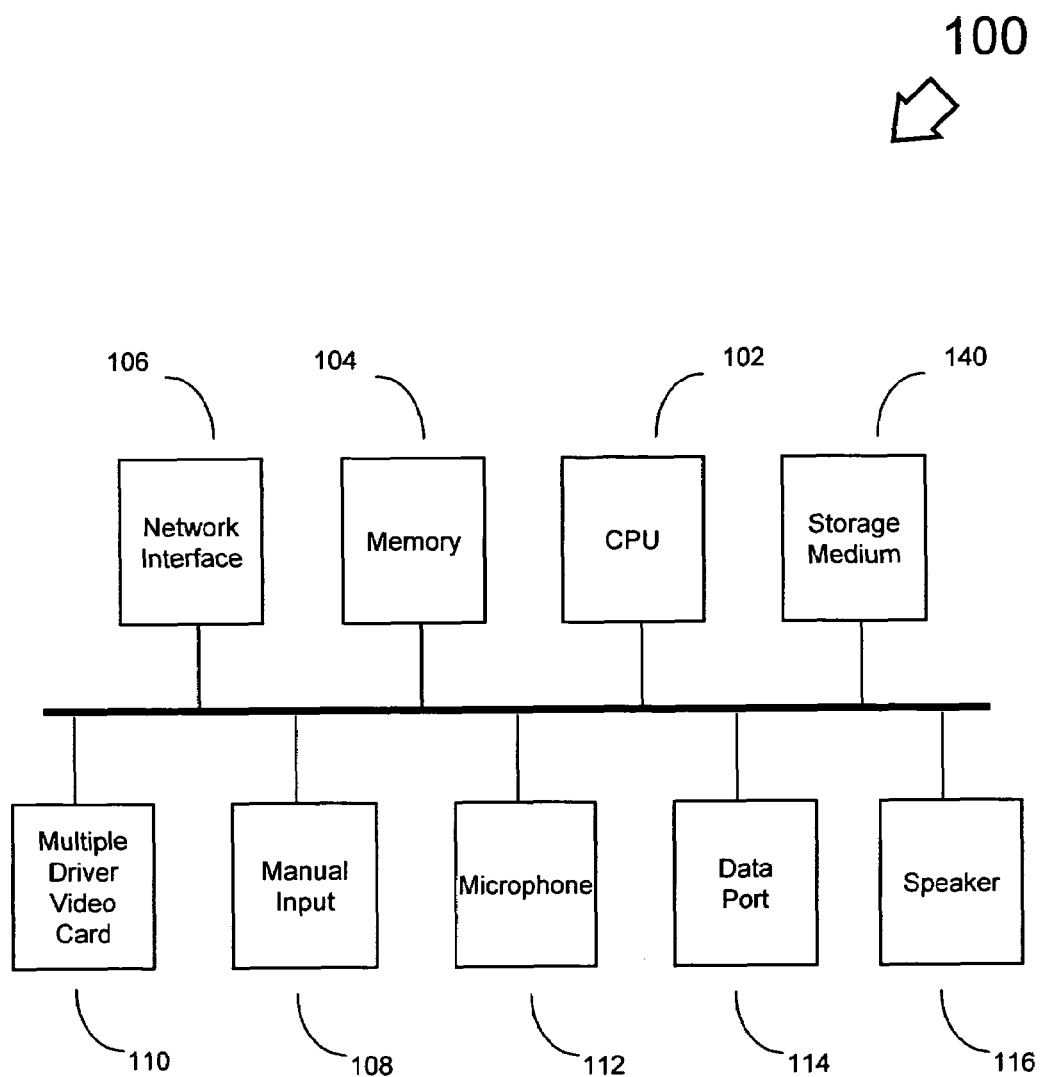
FIG. 2 is a block diagram of an apparatus embodiment configured to simplify user interface design through displaying portions of a single image on multiple screens, and processing feedback from multiple devices as if the interface was a single device.

Embodiments will now be disclosed with reference to a functional block diagram of an exemplary home automation computer 100 of FIG. 2, constructed and operative in accordance with an embodiment of the present invention. Home automation computer 100 may run a real-time multi-tasking operating system (OS) and include at least one processor or central processing unit (CPU) 102. In some alternate embodiments, home automation computer 100 runs a standard non-real-time operating system. Processor 102 may be any microprocessor or micro-controller as is known in the art.

The software for programming the processor 102 may be found at a computer-readable storage medium 140 or, alternatively, from another location across a communications network. Processor 102 is connected to computer memory 104. Home automation computer 100 may be controlled by an operating system that is executed within computer memory 104.

Processor 102 communicates with a plurality of peripheral equipment, including network interface 106. Additional peripheral equipment may include a multiple driver video card 110, manual input device 108, storage medium 140, microphone 112, data port 114, and speaker 116.

Multiple driver video card 110 is discussed in greater depth below.

Manual input device 108 may be a conventional keyboard, keypad, mouse, trackball, joystick, light pen, areas of a touch-sensitive screen or other input device as is known in the art for the manual input of data.

Storage medium 140 may be a conventional read/write memory such as a magnetic disk drive, floppy disk drive, compact-disk read-only-memory (CD-ROM) drive, digital versatile disk (DVD) drive, flash memory, memory stick, transistor-based memory or other computer-readable memory device as is known in the art for storing and retrieving data. Significantly, storage medium 140 may be remotely located from processor 102, and be connected to processor 102 via a network such as a local area network (LAN), a wide area network (WAN), or the Internet.

Microphone 112 may be any suitable microphone as is known in the art for providing audio signals to processor 102. In addition, a speaker 116 may be attached for reproducing audio signals from processor 102. It is understood that microphone 112, speaker 116, and data port 114 may include appropriate digital-to-analog and analog-to-digital conversion circuitry as appropriate.

Data port 114 may be any data port as is known in the art for interfacing with an external accessory using a data protocol such as RS-232, Universal Serial Bus (USB), or Institute of Electrical and Electronics Engineers (IEEE) Standard No. 1394 ('Firewire'). In some embodiments, data port 114 may be any interface as known in the art for communicating or transferring files across a computer network, examples of such networks include Transmission Control Protocol/internet Protocol (TCP/IP), Ethernet, Fiber Distributed Data Interface (FDDI), token bus, or token ring networks. In addition, on some systems, data port 114 may consist of a modem connected to network interface 106. Similarly, in some embodiments network interface 106 provides connectivity to home automation computer 100 to communicate with a network. Thus, the network interface 106 allows the home automation computer 100 to communicate and process input and output from across a network.

Figure 3:
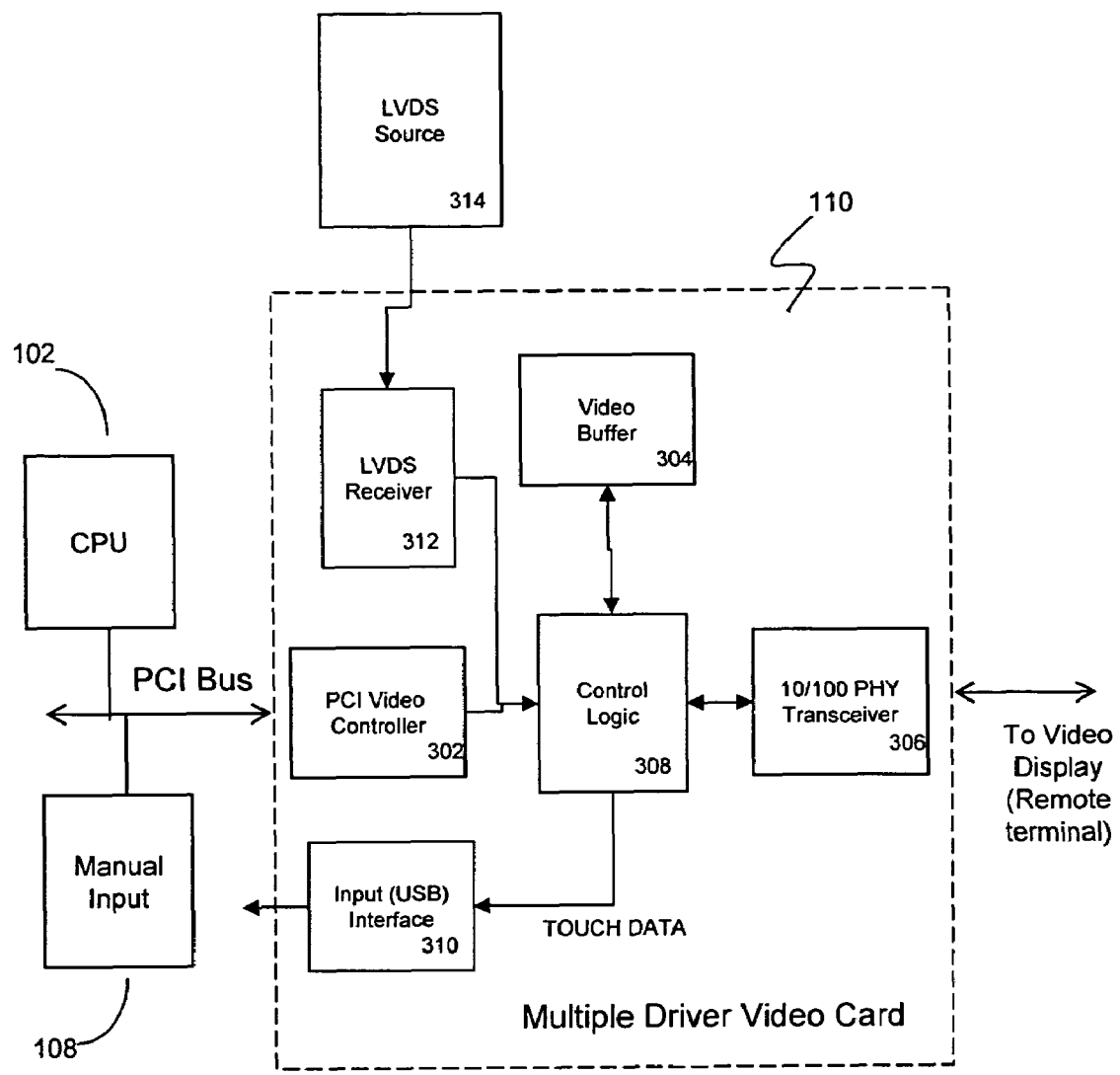
FIG. 3 is a block diagram of a multiple driver video card apparatus embodiment, central processing unit and manual input configured to simplify user interface design through displaying portions of a single image on multiple screens, and processing feedback from multiple devices as if the interface was a single device.

FIG. 3 depicts a block diagram of a multiple driver video card 110, configured to simplify user interface design through displaying portions of a single image on multiple screens, and processing feedback from multiple devices as if the interface was a single device, constructed and operative in accordance with an embodiment of the present invention. It is well understood by those in the art, that the functional elements of FIG. 3 may be implemented in hardware, firmware, or as software instructions and data encoded on a computer-readable storage medium 240. As depicted in FIG. 3, multiple driver video card 110 may be implemented as a stand-alone card that may be inserted into home automation computer 100. In alternate embodiments, multiple driver video card 110 may be inserted into other types of controllers, such as a programmable logic controller, or input/output ("I/O") monitoring devices. Alternatively, the components of multiple driver video card 110 may be embedded on to the motherboard of a home automation computer, programmable logic controller, or I/O monitoring device.

As shown, multiple driver video card comprises a video controller 302, video buffer 304, transceiver 306, control logic 308, and input interface 310. Alternate embodiments may also include a receiver 312.

Video controller 302 may be any device known in the art capable of converting signals generated from a computer to a format displayable on a monitor. A monitor may be a visual display such as a cathode ray tube (CRT) monitor, video projection, a liquid crystal display (LCD) screen, flat-panel display, touch-sensitive screen, or any other monitor known in the art for visually displaying images and/or text to a user. In some embodiments, video controller 302 is a Peripheral Component Interconnect (PCI) video controller, which is capable of communicating on a PCI bus, as is known in the art.

Video buffer 304 is any memory storage device known in the art that stores video information. Video buffer 304 may be implemented as a frame buffer or line buffer. In some embodiments, video buffer 304 may reside as a subset of memory 104. Video buffer 304 stores video pixel data before it is sent to a monitor, or in some instances remote terminal 20.

Transceiver 306 is any component or components known in the art used to couple multiple driver video card 110 with remote terminal 20. Transceiver 306 sends and receives data to-and-from remote terminal 20. As described above, in some embodiments the transceiver remote terminals 20 may be coupled to multiple driver video card 110 by any means known in the art, such a direct video connection or any communication network known in the art. In the embodiment depicted in FIG. 3, transceiver 306 enables a 10/100 MB Ethernet connection.

Control logic 308 may be any processor, microcontroller, or computing functionality, which separates a user interface image 50, as received by video controller 302, into multiple sub-images. Control logic 308 may calculate sub-image sizes based on the display capability of each individual remote terminal, and perform rotation, image cropping, image filling, upscaling or downscaling to fit the sub-image to the remote terminal display. Additionally, control logic 308 may store image data in video buffer 304 while performing image separation, image cropping, image filling, rotation, upscaling or downscaling operations. The resulting sub-images are forwarded to transceiver 306 to be output at remote terminal 20.

As part of its operation, control logic 308 also processes information received by transceiver 306. When transceiver 306 receives input data from the remote terminal 20, control logic 308 maps the input data received to the relevant portion of the user interface image 50. In turn, the mapped data is relayed to by input interface 310, emulating manual input 108. In effect, this mapping eliminates a special user interface design for reach individual remote terminal, and allows the system 1000 to treat all the interfaces of the remote terminals 20 as part of a single user interface.

Input interface 310 may be any component that maps or facilitates the data received from remote terminals 20 to the relevant portion of the user interface. In some embodiments, touch data received from a touch-screen remote terminal 20 may be routed through a Universal Serial Bus input interface 310, emulating USB manual input 108.

Figure 4:
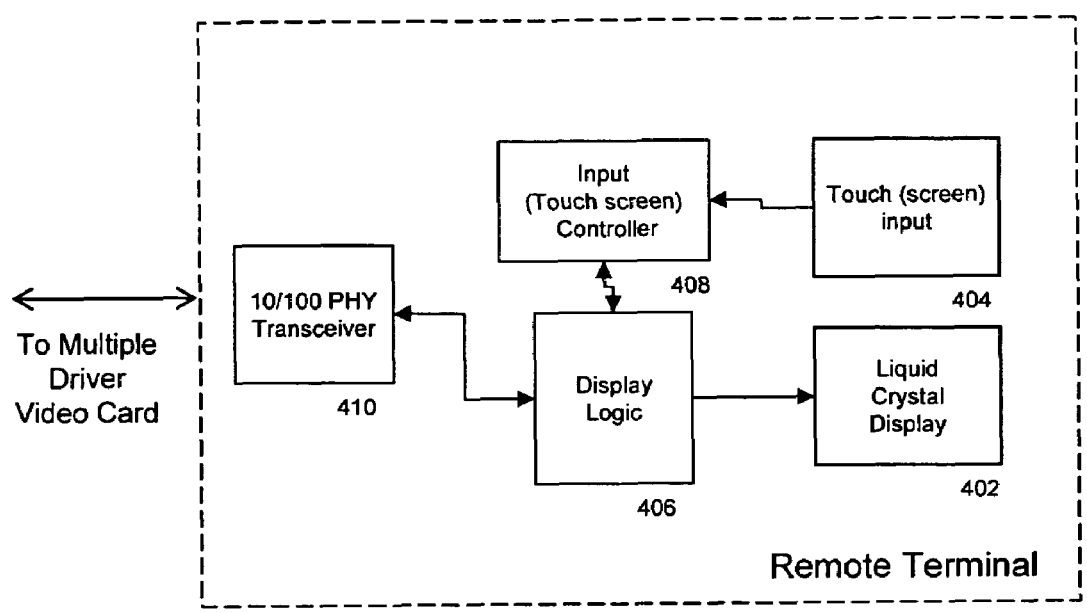
FIG. 4 is a block diagram of a remote terminal 20 embodiment configured to simplify user interface design through displaying portions of a single image.

Alternate embodiments of multiple driver video card 110 receives video input from an external source 314, such as a Low Voltage Differential Signaling (LVDS) source 314. In such embodiments, a receiver 312, such as an LVDS receiver 312 may be used to adapt the LVDS signal. As is known in the art, VDS is a transmission method for sending digital information to a flat panel display. LVDS has been widely used in laptops because it enables fewer wires to be used between the motherboard and the panel. The technology is also used between the image scaler and the panel in many stand-alone flat panel displays FIG. 4 is a block diagram of a remote terminal 20 embodiment configured to simplify user interface design through displaying portions of a single image, constructed and operative in accordance with an embodiment of the present invention. Remote terminal 20 comprises a display 402, touch input 404, an input controller 408, display logic 406, and a transceiver 410. These elements of FIG. 4 may be implemented in hardware, firmware, or as software instructions and data encoded on a computer-readable storage medium.

Remote terminal 20 embodiments receive a sub-image from multiple driver video card 110, via transceiver 410, and display the sub-image at display 402. Additionally, remote terminals receive user input from touch input 404, which is processed by input controller 408, and display logic 406, and is eventually transmitted back to multiple driver video card 110 via transceiver 410.

Display 402 may any type of video display known in the art, such as a cathode ray tube (CRT) monitor, a liquid crystal display (LCD) screen, projector, flat-panel display, touch-sensitive screen, or any other monitor known in the art for visually displaying images and/or text to a user. The remote terminal 20 embodiment pictured in FIG. 4 uses a liquid crystal display 402.

Touch input 404 may be any button, keypad, trackball, pointer, projection keyboard, optical bar/touch controller, or touch screen input device known in the art. Touch screen input 404 embodiments allow remote terminals 20 with lower surface areas, and allow flexible user interface designs.

Input controller 408 is any component in hardware, software, or firmware, which maps input received from the touch screen input 404 to a user interface displayed by liquid crystal display 402.

Display logic 406 processes sub-image received by transceiver 410. When transceiver 410 receives sub-image from the multiple driver video card 110 via transceiver 410, display logic 402 performs the graphic control functions necessary to facilitate the display of sub-image on liquid crystal display 402.

Transceiver 410 is any component or components on remote terminal 20 used to receive data from multiple driver video card 110. Transceiver 410 sends and receives data to-and-from multiple driver video card 110. In the embodiment depicted in FIG. 4, transceiver 410 enables a 10/100 MB Ethernet connection.

The previous description of the embodiments is provided to enable any person skilled in the art to practice the invention. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus comprising:
a user interface image comprising graphical user interface ("GUI") objects, each GUI object representing a control in a home automation system;
control logic configured to receive the user interface image and to separate the user interface image into a plurality of sub-images, wherein the GUI objects are distributed among the sub-images, wherein the plurality of sub-images includes overlapping sub-images, and wherein each of a pair of overlapping sub-images includes at least one GUI object in common that represents the same control in the home automation system;
a transceiver configured to convey the plurality of sub-images to remote terminals, and configured to receive input data from the remote terminals, wherein the input data is generated responsive to user selection of one of the distributed GUI objects displayed at one of the remote terminals; and
an input interface that maps the input data to a GUI object in the user interface image that corresponds to the selected distributed GUI object, wherein the control logic processes the input data received from the remote terminals to provide a control input for controlling the home automation system.

2. The apparatus of claim 1, wherein each remote terminal is located apart from the other remote terminals and wherein the input data from each remote terminal is generated independently of the other remote terminals, wherein the apparatus masks the presence of plural remote terminals, thereby presenting an appearance of a single user-interface to the home automation system.

3. The apparatus of claim 2, wherein the plurality of sub-images includes differently sized sub-images.

4. The apparatus of claim 3, wherein the transceiver is configured to communicate over a communication network.

5. The apparatus of claim 4, wherein the communication network is a wired network.

6. The apparatus of claim 4, wherein the communication network is a wireless network.

7. The apparatus of claim 3, wherein the video controller is a Peripheral Component Interconnect video controller.

8. The apparatus of claim 3, further comprising a receiver configured to receive the user interface image from the external source.

9. The apparatus of claim 8, wherein the receiver is configured to receive a Low Voltage Differential Signal.

10. An apparatus comprising:
a user interface image including graphical user interface ("GUI") objects, each GUI object representing a control in a home automation system;
control logic configured to receive the user interface image and to separate the user interface image into a plurality of sub-images, wherein the GUI objects are distributed among the sub-images, wherein the plurality of sub-images includes overlapping sub-images each pair of overlapping sub-images including at least one GUI object in common that represents the same control in the home automation system;
a transceiver configured to convey the plurality of sub-images to remote terminals, and configured to receive input data from the remote terminals, wherein the input data is generated responsive to user selection of one of the distributed GUI objects displayed at one of the remote terminals; and
an input interface that maps the input data to a GUI object in the user interface image that corresponds to the selected distributed GUI object, wherein the control logic processes the input data received from the remote terminals to provide a control input for controlling the home automation system, wherein
each remote terminal is located apart from the other remote terminals,
wherein the input data from each remote terminal is generated independently of the other remote terminals,
wherein the apparatus masks the presence of plural remote terminals, thereby presenting an appearance of a single user-interface to the home automation system, and
wherein the plurality of sub-images includes differently sized sub-images.

11. A method comprising:
providing a user interface image, the user interface image including graphical objects;
separating the user interface image into a plurality of sub-images;
conveying selected ones of the plurality of sub-images to remote terminals, the selected sub-images including different sets of the graphical objects;
receiving input data from the remote terminals, wherein the input data is generated by a selection of a graphical object displayed at one of the remote terminals; and
processing the received input data from the selected remote terminals, wherein processing the received input data includes
mapping the input data to a corresponding graphical object in the user interface image, wherein the selected graphical object in the one remote terminal and the corresponding graphical object in the user interface image represent a home automation control; and
providing an input to a home automation system based on the mapping step, wherein the input controls a component of the home automation system,
wherein the plurality of sub-images comprises a pair of overlapping sub-images, and wherein both sub-images in the pair of overlapping sub-images include at least one GUI object in common which represents the same home automation control.

12. The method of claim 11, wherein each of the plurality of remote terminals is distinct from the other remote terminals and has a user interface separate from the other remote terminals, and wherein the step of providing the user interface includes concealing the presence of multiple terminals from a system processing the input data.

13. The method of claim 12, wherein the conveying of the plurality of sub-images to the selected remote terminals is performed using a communication network.

14. The method of claim 13, wherein the communication network is a wired network.

15. The method of claim 13, wherein the communication network is a wireless network.

16. The method of claim 13 wherein the input data is received via a Universal Serial Bus.

17. The method of claim 13, wherein providing the user interface image includes generating an image using a Peripheral Component Interconnect video controller.

18. The method of claim 13, wherein providing the user interface image includes receiving an image signal from an external source.

19. The method of claim 18, wherein the image signal is a Low Voltage Differential Signal.

20. The method of claim 11, wherein the component of the home automation system comprises one or more of a home entertainment system, a security system and a heating, ventilation and air-conditioning system.

21. The apparatus of claim 20, wherein the graphical objects include buttons, radio buttons and slider bars.

22. The apparatus of claim 20, wherein the graphical objects include one or more of a check box a menu and a dialog box.

23. The apparatus of claim 20, wherein the graphical objects include one or more indicators.

24. The apparatus of claim 20, wherein the different sets of the graphical objects include two or more sets having at least one graphical object in common.

25. A computer-readable medium, encoded with data and instructions, such that when executed by a device, the instructions causes the device to:
provide a user interface image, the user interface image including graphical user interface ("GUI") objects;
separate the user interface image into a plurality of sub-images;
convey selected ones of the plurality of sub-images to remote terminals, the selected sub-images including different sets of the GUI objects;
receive input data from the remote terminals, wherein the input data is generated by selection of one of the GUI objects at one of the remote terminals; and
process the input data received from the selected remote terminals, wherein processing the input data includes
mapping the input data to a corresponding GUI object in the user interface image, wherein the selected graphical object in the one remote terminal and the corresponding graphical object in the user interface image represent a home automation control; and
providing an input to a home automation system based on the mapping step, wherein the input controls a component of the home automation system,
wherein the plurality of sub-images comprises a pair of overlapping sub-images, and wherein both sub-images in the pair of overlapping sub-images include at least one GUI object in common which represents the same home automation control.

26. The computer-readable medium of claim 25, wherein each of the plurality of remote terminals is distinct from the other remote terminals and has a user interface separate from the other remote terminals, and wherein the provided user interface conceals the presence of multiple terminals from a system processing the input data.

27. The computer-readable medium of claim 26, wherein the plurality of sub-images is conveyed to the selected remote terminals using a communication network.

28. The computer-readable medium of claim 27, wherein the communication network is a wired network.

29. The computer-readable medium of claim 27, wherein the communication network is a wireless network.

30. The computer-readable medium of claim 27, wherein the input data is configured to be received via a Universal Serial Bus.

31. The computer-readable medium of claim 27, wherein the user interface image is generated via a Peripheral Component Interconnect video controller.

32. The computer-readable medium of claim 27, wherein the instructions further cause the device to:
  receive an image signal from an external source; and
  provide the user interface image based on the received image signal.

33. The computer-readable medium of claim 32, wherein the received image signal is a Low Voltage Differential Signal.

34. A system comprising:
  a controller for controlling a home automation system;
  control logic configured to separate a user interface image into a plurality of sub-images, wherein the user interface image comprises graphical user interface ("GUI") objects representing a plurality of controls associated with the home automation system and wherein each of the sub-images includes one or more of the GUI objects;
  a transceiver configured to convey the plurality of sub-images to terminals remote from each other and from the controller, and configured to receive input data generated by a user interaction with a selected GUI object displayed at one of the remote terminals; and
  an input interface that maps the input data to a GUI object in the user interface image that corresponds to the selected GUI object and provides the controller a control input for controlling one or more of a home entertainment system, a security system and a heating, ventilation and air-conditioning system, wherein
  the plurality of sub-images comprises at least two sub-images that overlap each other, repeat data in the user interface image and include the same GUI object representing the same control.

35. The system of claim 34, wherein the GUI objects include one or more of a button, a radio button, a slider bar, check boxes, a menu and a dialog box.

36. The system of claim 34, wherein the GUI objects include one or more indicators.

37. The system of claim 34, wherein the input interface conceals the presence of the remote terminals from the controller.

* * * * *